United States Patent [19]

Schimmel et al.

[11] Patent Number: 4,906,445

[45] Date of Patent: Mar. 6, 1990

[54] CONTINUOUS PROCESS FOR COMPLETE REMOVAL OR ORGANIC IMPURITIES FROM AND COMPLETE DECOLORIZATION OF PREPURIFIED WET-PROCESS PHOSPHORIC ACID

[75] Inventors: Günther Schimmel; Gerhard Bettermann; Gero Heymer, all of Erftstadt; Friedrich Kolkmann, Brühl, all of Fed. Rep. of Germany

[73] Assignee: Hoechst Aktiengesellschaft, Frankfurt am Main, Fed. Rep. of Germany

[21] Appl. No.: 311,640

[22] Filed: Feb. 16, 1989

[30] Foreign Application Priority Data

Mar. 3, 1988 [DE] Fed. Rep. of Germany ....... 3806822

[51] Int. Cl.$^4$ ............................................. C01B 25/16
[52] U.S. Cl. ............................ 423/321 R; 423/321 S
[58] Field of Search ........................ 423/321 R, 321 S

[56] References Cited

U.S. PATENT DOCUMENTS

| | | | |
|---|---|---|---|
| 3,993,733 | 11/1976 | Irani .................................. | 423/321 S |
| 3,993,736 | 11/1976 | Irani .................................. | 423/321 S |
| 4,256,570 | 3/1981 | Allen et al. ...................... | 423/321 X |
| 4,279,878 | 7/1981 | Maurer et al. . | |
| 4,297,334 | 10/1981 | McConomy et al. .......... | 473/321 R |
| 4,330,516 | 5/1982 | Winand . | |
| 4,369,169 | 1/1983 | Nineuil et al. ................... | 423/321 S |
| 4,452,768 | 6/1984 | Gradl et al. ...................... | 423/321 R |
| 4,503,022 | 3/1985 | Majumdar ........................ | 423/321 S |
| 4,539,192 | 9/1985 | Schimmel et al. . | |
| 4,540,558 | 9/1985 | Gradl et al. ...................... | 423/321 S |
| 4,637,922 | 1/1987 | Nakatani et al. ................. | 423/321 R |
| 4,643,883 | 2/1987 | Borchert et al. ................. | 423/321 S |
| 4,713,229 | 12/1987 | Schimmel et al. ............... | 423/321 S |

FOREIGN PATENT DOCUMENTS

| | | | |
|---|---|---|---|
| 2429758 | 1/1975 | Fed. Rep. of Germany ... | 423/321 R |
| 2507170 | 12/1982 | France ............................. | 423/321 R |

OTHER PUBLICATIONS

European Patent Application 0015809, published 9-17-80.

*Primary Examiner*—John Doll
*Assistant Examiner*—Wayne H. Langel

[57] ABSTRACT

A continuous process is indicated for complete removal of organic impurities from and complete decolorization of pre-purified wet-process phosphoric acid which has been purified by an extractive method using an organic solvent, freed from residual hydrofluoric acid by steam stripping and treated with hydrogen peroxide at elevated temperature, which comprises mixing the pre-purified wet-process phosphoric acid and the hydrogen peroxide in a mixing zone at a temperature of from 100° to 200° C., preferably 140° to 160° C., and allowing them to react at this temperature for a further 1 to 4 hours, cooling to from 85° to 90° C. the pre-purified wet-process phosphoric acid treated in this way and pumping it at this temperature with exclusion of air firstly through an activated charcoal bed which has been prepared on the basis of peat and has been steam-activated and has a BET surface area of from 800 to 1000 m$^2$/g, and subsequently through a silicon carbide and/or graphite bed while maintaining a pumping rate of less than 0.5 m$^3$/h of wet-process phosphoric acid per m$^3$ of activated charcoal bed.

10 Claims, No Drawings

CONTINUOUS PROCESS FOR COMPLETE REMOVAL OR ORGANIC IMPURITIES FROM AND COMPLETE DECOLORIZATION OF PREPURIFIED WET-PROCESS PHOSPHORIC ACID

The invention relates to a continuous process for complete removal of organic impurities from and complete decolorization of pre-purified wet-process phosphoric acid which has been purified by an extractive method using an organic solvent, freed from residual hydrofluoric acid by steam stripping and treated with hydrogen peroxide at elevated temperature.

The pure phosphoric acid prepared according to the invention is of foodstuffs quality and has absolutely no unattractive coloration or odorous substances.

As is known, wet-process phosphoric acids are obtained by digesting phosphate ore with sulfuric acid. After the calcium sulfate precipitate has been removed, the wet-process phosphoric acid is freed from heavy metals by an extractive method using organic solvents. In order to remove fluorine, the wet-process phosphoric acid can be stripped with steam at temperatures of from 120 to 180° C. and a pressure of from about 1.5 to 2.5 bar.

In this purification step, residues of the extractant and some of the organic impurities originating from the phosphate ore are simultaneously blown out.

In the process of U.S. Pat. No. 4,330,516, removal of the organic impurities is effected by concentrating the wet-process phosphoric acid to a content of from 50 to 62% by weight of $P_2O_5$, adding hydrogen peroxide as oxidant and subsequently decolorizing the mixture using powdered activated charcoal while warming to at least 110° C.

In the process of U.S. Pat. No. 4,279,878, removal of the organic impurities is effected by treating the wet-process phosphoric acid with hydrogen peroxide in the presence of a noble-metal catalyst and/or in the presence of a metal-oxide catalyst which is inert towards phosphoric acid.

U.S. Pat. No. 4,539,192 describes a process for removal of the organic impurities from wet-process phosphoric acid in a special-purpose apparatus. In this process, the oxygen liberated on decomposition of the hydrogen peroxide causes pre-oxidation of the organic impurity. The wet-process phosphoric acid purified in this way still contains from 5 to 9 ppm of organically bound carbon and has a slight coloration and can therefore not be employed for various applications.

The object of the present invention was therefore to indicate a continuous process which permits complete removal of organic impurities from and complete decolorization of pre-purified wet-process phosphoric acid.

Complete removal of organic impurities is achieved when less than 4 ppm of organically bound carbon are determined analytically in the wet-process phosphoric acid. Complete decolorization of pre-purified wet-process phosphoric acid is achieved when the transmission of the phosphoric acid, measured against water in 5-cm cells at 365 nm, is greater than 80%. West German Additives Control Regulation of July 10, 1984, Bundesgesetzblatt I, No. 30, 6897 to 901, states that the content of volatile acids, calculated as acetic acid, must be less than 10 ppm.

The measurement arrangement used hitherto to determine the transmission of phosphoric acids in 1-cm cells is too insensitive for the purities required here. The unexpectedly large change in the numerical value when 1- and 5-cm cells are used arises from the "Lambert-Beer Law":

$$E_1 \epsilon = . c . l_1$$
$$E_5 \epsilon = . c . l_5$$
$$E_1 = 1/5 \, E_5$$
$$-\log T_1 = -1/5 \log T_5$$
$$T_1 = \sqrt[5]{T_5}$$

$E_1$ = Extinction in 1-cm cell
$E_5$ = Extinction in 5-cm cell
$\epsilon$ = absorptivity
$c$ = concentration of coloring substances
$l_1$ = Length of the 1-cm cell
$l_5$ = Length of the 5-cm cell
$T_1$ = Transmission in 1-cm cell
$T_5$ = Transmission in 5-cm cell A transmission of 80% (90%), measured in a 5-cm cell, thus corresponds to a transmission of 95.6% (97.9%) measured in a 1-cm cell. Surprisingly, it has now been found that this object can be achieved by mixing the pre-purified wet-process phosphoric acid and the hydrogen peroxide in a mixing zone at a temperature of from 100 to 200° C., preferably 140 to 160° C., and allowing them to react at this temperature for a further 1 to 4 hours, cooling to from 85 to 90° C. the pre-purified wet-process phosphoric acid treated in this way and pumping it at this temperature with exclusion of air firstly through an activated charcoal bed, which has been prepared from peat and has been steam-activated and has a BET surface area of from 800 to 1000 $m^2/g$, and subsequently through a silicon carbide and/or graphite bed, while maintaining a pumping rate of less than 0.5 $m^3/h$ of wet-process phosphoric acid per $m^3$ of activated charcoal bed.

The process according to the invention may furthermore optionally have the features that (a) the hydrogen peroxide is metered into the intake port of a centrifugal pump by means of which the wet-process phosphoric acid is pumped;

(b) from 5 to 30 kg of 30% strength hydrogen peroxide are metered in per $m^3$ of wet-process phosphoric acid;

(c) less than 0.4 $m^3/h$, in particular from 0.3 to 0.35 $m^3/h$, of wet-process phosphoric acid flow per $m^3$ of activated charcoal bed;

(d) the activated charcoal bed is arranged on the silicon carbide and/or graphite bed in a common container;

(e) in order to achieve long service lives, the activated charcoal bed and the silicon carbide and/or graphite bed are backwashed with the wet-process phosphoric acid purified according to the invention.

If the activated charcoal and silicon carbide and/or graphite beds are arranged in a common container with a supporting grid, a 2000 to 5000 mm deep bed of activated charcoal is introduced onto a 20 to 150 mm deep bed of crushed silicon carbide and/or graphite having a grain size of from 5 to 12 mm.

The activated charcoal grade ®Norit ROX 0.8 from Messrs. Norit Adsorption GmbH, Adlerstr. 54, 4000 Düsseldorf, has proven successful. This activated charcoal is in pellet form (from 2 to 6 mm in length; 0.8 mm in diameter). The use of three activated charcoal beds has proven particularly successful. In this case, two beds are operated successively, while the third bed is regenerated.

In the case of the successive beds, a freshly regenerated bed follows the partly charged bed.

The examples illustrate the present invention.

EXAMPLE 1

10 m$^3$/h of pre-purified wet-process phosphoric acid were pumped by means of a centrifugal pump from a storage tank into a polytetrafluoroethylene-lined, sealed 15 m$^3$ tank. At the same time, 100 kg/h of hydrogen peroxide (30% of H$_2$O$_2$) were metered into the intake port of the centrifugal pump. The pre-purified wet-process phosphoric acid had a temperature of 145° C. and the following analytical data:

| | |
|---|---|
| P$_2$O$_5$ | 61.9% by weight |
| Heavy metals | <1 ppm |
| CaO | <5 ppm |
| F | 3 ppm |
| Volatile acids, calc. as CH$_3$COOH | 35 ppm |
| SO$_4$ | 150 ppm |
| C | 75 ppm |
| Transmission | 82% in 1-cm cell; 37.3% in 5-cm cell. |

The outlet branch of the centrifugal pump ended 100 mm above the base of the 15 m$^3$ tank. An overflow siphon installed in the upper third maintained a level of 12 m$^3$ in the 15 m$^3$ tank.

The wet-process phosphoric acid overflowing (10 m$^3$/h) was then cooled to 90° C. in a graphite cooler and passed through two successive activated charcoal and silicon carbide beds, each arranged in a 15 m$^3$ tank 2200 mm in diameter.

A supporting grid made of graphite on which was located a 80 mm deep silicon carbide bed of grain size from 5 to 8 mm was located in the 15 m$^3$ tank. A 3500 mm deep activated charcoal bed of pellet-form ®Norit ROX 0.8 (from 2 to 6 mm in length; 0.8 mm in diameter) was located on the silicon carbide bed. The downstream activated charcoal bed was freshly regenerated; a total of 25000 m$^3$ of wet-process phosphoric acid from earlier batches had already flowed through the upstream activated charcoal bed. In this case, the activated charcoal bed which was now upstream was operated as the downstream activated charcoal bed. A suitable siphon arrangement ensured that the wet-process phosphoric acid to be filtered was contacted with the activated charcoal with exclusion of air. <4 ppm of C were determined in the wet-process phosphoric acid obtained; the transmission was 96.5% in the 5-cm cell; 99.3% in the 1-cm cell. After an operating time of 4 weeks, no change in transmission had occurred. The purified wet-process phosphoric acid was completely odorless. The content of volatile acids, calculated as CH$_3$COOH, was 5 ppm.

EXAMPLE 2

The procedure corresponded to Example 1, with the difference that the pre-purified wet-process phosphoric acid was now pumped around in the 15 m$^3$ tank by means of a centrifugal pump. The outlet branch of the centrifugal pump ran until just below the liquid level. The amount of wet-process phosphoric acid circulated by the centrifugal pump was 250 m$^3$/h. The wet-process phosphoric acid was fed to the intake port of the centrifugal pump through a base valve in the 15 m$^3$ tank. 10 m$^3$/h of the wet-process phosphoric acid being circulated were cooled to 85° C. in a graphite cooler and pumped through two successive activated charcoal beds. 100 kg/h of hydrogen peroxide (30% of H$_2$O$_2$) were metered into the intake port of the centrifugal pump. The pre-purified wet-process phosphoric acid removed from the storage tank had a temperature of 140° C. and the following analytical data:

| | |
|---|---|
| P$_2$O$_5$ | 61.6% by weight |
| Heavy metals | <1 ppm |
| CaO | <5 ppm |
| F | 4 ppm |
| Volatile acids, calc. as CH$_3$COOH | 40 ppm |
| SO$_4$ | 170 ppm |
| C | 95 ppm |
| Transmission | 78.3% in 1-cm cell; 29.4% in 5-cm cell. |

The purified wet-process phosphoric acid contained <4 ppm of C; the transmission was 96.6% in the 5-cm cell; 99.3% in the 1-cm cell. After an operating time of 4 weeks the transmission was 96.5% in the 5-cm cell; 99.3% in the 1-cm cell. The wet-process phosphoric acid was completely odorless. The content of volatile acids, calculated as CH$_3$COOH, was 4 ppm.

We claim:

1. A continuous process for complete removal of organic impurities from and complete decolorization of pre-purified wet-process phosphoric acid which has been purified by an extractive method using an organic solvent, freed from residual hydrofluoric acid by steam stripping and treated with hydrogen peroxide at elevated temperature, which comprises mixing the pre-purified wet-process phosphoric acid and the hydrogen peroxide in a mixing zone at a temperature of from 100° to 200° C. and allowing them to react at this temperature for a further 1 to 4 hours; cooling to from 85° to 90° C. the pre-purified wet-process phosphoric acid treated in this way and pumping the wet-process phosphoric acid at this temperature with exclusion of air firstly through an activated charcoal bed which has been prepared from peat and has been steam-activated and has a BET surface area of from 800 to 1000 m$^2$/g, while maintaining a pumping rate of less than 0.5 m$^3$/h of wet-process phosphoric acid per m$^3$ of activated charcoal bed, and subsequently pumping the wet-process phosphoric acid through a silicon carbide or graphite bed 2. The process as claimed in claim 1, wherein the hydrogen peroxide is metered into the intake port of a centrifugal pump by means of which the pre-purified wet-process phosphoric acid is pumped.

3. The process as claimed in claim 1, wherein from 5 to 30 kg of 30% strength hydrogen peroxide are metered in per m$^3$ of wet-process phosphoric acid.

4. The process as claimed in claim 1, wherein less than 0.4 m$^3$/h of wet-process phosphoric acid flow per m$^3$ of activated charcoal bed.

5. The process as claimed in claim 1, wherein the activated charcoal bed is arranged on the silicon carbide bed in a common container.

6. The process as claimed in claim 1, wherein the activated charcoal bed is arranged on the graphite bed in a common container.

7. The process as claimed in claim 1, wherein, the activated charcoal bed is backwashed with the wet-process phosphoric acid purified according to claim 1.

8. The process as claimed in claim 1, wherein, the silicon carbide bed is back-washed with the wet-process phosphoric acid purified according to claim 1.

9. The process as claimed in claim 1, wherein, the graphite bed is back-washed with the wet-process phosphoric acid purified according to claim 1.

10. The process as claimed in claim 1, wherein the pre-purified wet-process phosphoric acid and hydrogen peroxide are mixed at a temperature of from 140° to 160° C.

* * * * *